G. E. BURT. Belt-Splice.
No. 129,928. Patented July 30, 1872.
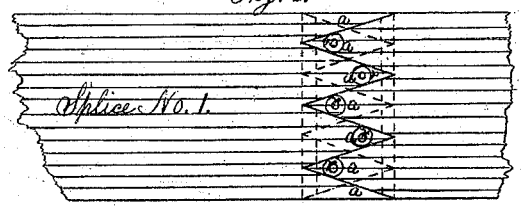
Fig. 1. Splice No. 1.
Fig. 2. Splice No. 2.
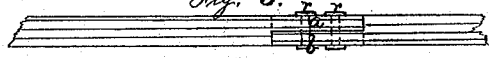
Fig. 3.
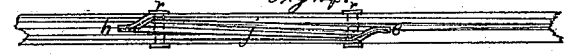
Fig. 4.
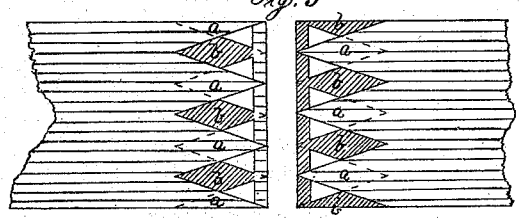
Fig. 5.
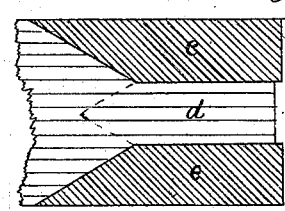
Fig. 6.
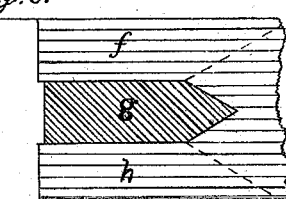
Fig. 6. (cont.)
Fig. 7.
Fig. 8.
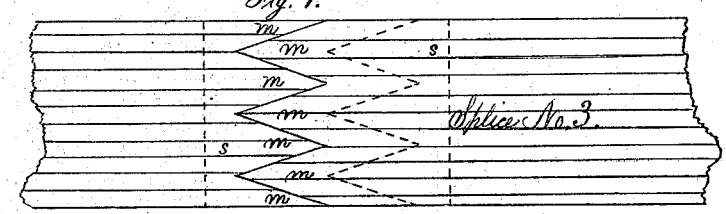
Fig. 9. Splice No. 3.
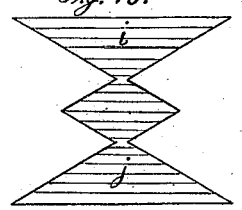
Fig. 10.
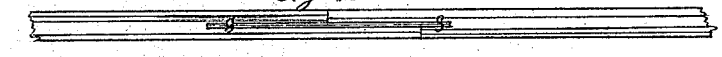
Fig. 11.
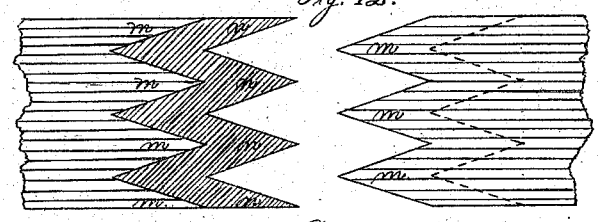
Fig. 12.
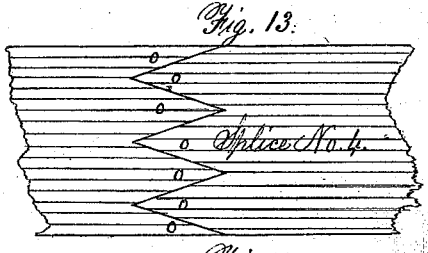
Fig. 13. Splice No. 4.
Fig. 14.
Fig. 15.
Witnesses.
E. A. Hildreth.
A. C. Burt.
Inventor.
George E. Burt.

UNITED STATES PATENT OFFICE.

GEORGE E. BURT, OF HARVARD, MASSACHUSETTS.

IMPROVEMENT IN BELT-SPLICES.

Specification forming part of Letters Patent No. 129,928, dated July 30, 1872.

SPECIFICATION.

I, GEORGE E. BURT, of Harvard, in the county of Worcester and State of Massachusetts, have invented an Improved Belt-Splice, of which the following is a specification:

It is well known that the beveled splice-joint usually made for connecting belting, although secured by cement, rivets, pegs, or sewing, is liable to fail long before the belt is worn out, as the ends of the splices are so very thin that the sewing or riveting at the ends fails to hold them down, and thus the splice is weakened and fails, and it is necessary to repair the joints. This failure in the joints is caused by the thin edge on the outside of the belt peeling up. This is caused by the action of the belt in bending on the pulleys, and the failure occurs sooner on belts where shippers are used, as the friction caused by the shipper soon chafes up the laps. There is also considerable leather wasted in forming the common beveled lap-splice. The object of this invention is to avoid the above difficulties, and to construct a strong splice with less waste of material than is usual in the common splice. The nature of this invention consists in constructing the splices for belting in such a manner that the ends of the splice are secured and protected from the liability of peeling up; also, in constructing a splice by means of splitting the ends of the belt and cutting out the part to be removed nearly longitudinally, leaving the parts to be connected thick and firm, and, in addition to cementing, it may be either pegged, sewed, or riveted, the ends being held down by a portion of the material forming the splice.

Description of the Accompanying Drawing.

Figure 1 is a top view of splice No. 1 when united. Fig. 3 is a side or edge view of same parts as shown in Fig. 1. Fig. 2 is a top view of splice No. 2 when united. Fig. 4 is a side or edge view of same parts as shown in Fig. 2. Fig. 5 is a top view of the two parts of splice No. 1 before they are united. Fig. 7 is a side or edge view of the same parts as shown in Fig. 5. Fig. 6 is a top view of the two parts of splice No. 2 before they are united. Fig. 8 is a side or edge view of the same parts as shown in Fig. 6. Fig. 9 is a top view of splice No. 3. Fig. 11 is a side or edge view of same parts as shown in Fig. 9. Fig. 10 is an auxiliary piece of leather put into splice No. 2 to give it fullness, strength, and form. Fig. 12 is a top view of the two parts of splice No. 3 before they are united. Fig. 14 is a side or edge view of the same parts as shown in Fig. 12. Fig. 13 is a top view, showing the method of uniting double belting. Fig. 15 is a side or edge view of same as shown in Fig. 13.

General Description.

I manufacture belting of leather, and connect the strips together by several forms, represented in the drawing by splices Nos. 1, 2, 3, and 4. In splice No. 1 I split the ends of the strips in the middle, of the thickness of the leather, about the length of the splice. (See Fig. 3.) The upper and lower portions of the leather are then cut into alternate points *a* and *b*, which will fit into each other. (See Figs. 5 and 7.) A narrow strip of leather is left to connect the points, and, being pared very thin, readily passes under the other points of the opposite side and holds the points very firmly together, and avoids all liability of their ever spreading or working out of place. The parts shown in Fig. 5, after being cut, are placed together, cemented, placed under pressure sufficient to bring all the parts smooth and level, and afterward riveted by rivets *r*, which, in every case, have one-half the thickness of each end of the splice to hold in. (See Figs. 1 and 3.) To form splice No. 2, in which all the ends are tucked under, as shown in Fig. 2, I proceed as follows: I first split the ends and bevel the edges, as shown in Fig. 8. I then cut the upper and lower portions to be united, as shown in Fig. 6. In all the figures the light-shaded surfaces represent the upper face of the belt, and the darker-shaded surfaces represent the portions of the lower sections of the splice, which are seen in a top view. The splice is then united, as shown in Fig. 2, the ends of the tongues *f* and *h* (see Fig. 6) being inserted under the base and beveled portion of the tongue *d*, and the ends of the tongues *c* and *e* being inserted under the base of the tongue *g*. The piece *i j*, Fig. 10, is placed in the joint,

*j* coming under the letter *h* in Fig. 2, and *i* under *f*. This auxiliary piece makes the joint all of a uniform thickness, and gives additional strength. This splice, when joined, is cemented, and then placed under pressure to bring all the parts into their proper place, and is afterward riveted, sewed, or pegged, and forms a splice, as shown in Fig. 2. Splice No. 3 is constructed substantially like splice No. 1; but the connecting sections are placed in different positions. In this joint the belt must be split further in, and one portion of the angular sections is placed in the rear of the other instead of directly underneath it. In this splice the points are not cut alternately, but one directly behind the other, so that in passing through a shipper the outer points are always rubbed from their base toward their apex, and therefore will be more durable than if rubbed in the other direction. This splice gives a longer joint and more sticking surface than splice No. 1. The bar to connect the points can, if desired, be used in this splice the same as in No. 1, and the bar will, by the pressure to which the joint is subjected, be pressed into the leather passing over it. This will form a kind of a lock-joint, bending the leather so that it will resist a very great strain. In this joint (see Fig. 11) there is inserted a thin piece of fine leather *s* (calf or some good quality of leather) between the sections, and made long enough to be extended beyond the base of the sections on both ends of the belts to be joined.

It will be seen that this additional piece of leather presents a double adhering surface to be cemented to the upper and lower sections of each piece of the belt to be joined, and makes a firm, strong joint in a poor quality of leather. Manufacturers of belting have a call for strips of cheap or second-quality belting, to be used for aprons or carriers. This article is made of the coarse or spongy portions of the leather, and by inserting a firm, strong piece of leather into the joints the durability of such aprons or carriers is very much increased.

Splice No. 4 represents a joint in a double belt, in which each portion of the belt is joined in the same manner as the upper or lower section in splice No. 1, while the other belt breaks joints and is united in the same manner by tapering points fitting into the next piece to be joined.

By this method of splicing belts the outer ends of the splice cannot be started or chafed up by use, as there are no thin ends to start up. The connecting sections are sufficiently thick to be firmly cemented together, and have sufficient thickness to be firmly riveted, sewed, or pegged in every part of the splice. In splice No. 2 (see Figs. 2 and 4) the ends are all tucked under and terminate in the center of the leather, and the ends also make an angle over the end of the brace *i j*, thus forming a lock on all the ends. In Fig. 1 the bar connecting the points is cemented near the middle of the leather. This also forms a lock to strengthen the joint and securely holds down all the sections connected to it, all giving the entire strength and substance of the leather equal in all parts of the joint for sewing, riveting, or pegging.

In the common lap-joint it is only in the central portions of the lap that the substances are of equal strength and thickness to be riveted or sewed, and both of the outer ends are thicker on the one part and thinner on the other till they taper off to an edge. These edges are what first peel up and weaken the joint, as there is not substance enough to secure them down. In this improved splice the substance is nearly of the same thickness in all its parts, and as firm in all its parts to receive rivets as the common joint is in its firmest part. This improved splice requires less length of leather to construct it from than the common lap, and in large wide belts there would be a great saving in material, which is very expensive. In this improved splice all the cemented portions of the leather are placed near the central portions of the belt, so that when the belt is bent in passing over a pulley there will be but very little tendency either to stretch or crush the cement, as the surfaces of the belt are the portions which are always strained the most in bending the belt, while the center remains without additional strain. Therefore the cement in this joint will be very much more durable than in the common lap, where the cement comes to both surfaces, and is sure to be strained most severely where the lap is most liable to start up—*i. e.*, at its outer edges.

This method has been tested with a lap one and a half inch long in belts with the common lap three and a half inches long, and thus far has proved full as strong as the three-and-a-half-inches lap, and with less liability of the ends peeling up. On double belts this splice is very desirable and saves a large amount of material.

The ends of the parts *f*, *h*, *d*, *c*, *e*, and *g*, Fig. 6, which are tucked beneath the surface, afford surfaces on both their sides to adhere to the opposite portion of the splice, instead of one side only, as in the common splice. This is also a feature of great importance when combined with the other advantages of this splice, as the more sticking surface that can be provided the stronger the joint and the less length required in the splice, saving stock, which is the principal expense in manufacturing belting. The bars or webs which connect the points *a a* also in the same manner present two sticking surfaces to be cemented to as they are inserted between the two parts of the opposite portion of the splice. These bars or webs may be made as wide as desirable, thus increasing the sticking surface of the joint without requiring any more stock.

Having now described the nature and operation of my invention, what I claim as new, and desire to secure by Letters Patent, is—

1. The belt-splice formed by splitting each end of the pieces to be united parallel with the surface of the belt and then uniting the alternate edges, substantially as described, and for the purpose set forth.

2. A splice in belting when constructed with tongues *f*, *c*, *d*, and *g*, the ends of these tongues passing beneath the surface of the portion with which they are connected, the covering-edges forming bevels or acute angles with the line of the belt, substantially as described, and for the purpose set forth.

3. The auxiliary piece of leather S S, cemented between the upper and lower portions of the belt-splice, substantially as described, and for the purpose set forth.

GEORGE E. BURT.

Witnesses:
E. A. HILDRETH,
A. C. BURT.